(12) United States Patent
Rajendran

(10) Patent No.: US 11,587,174 B2
(45) Date of Patent: Feb. 21, 2023

(54) SYSTEM AND METHOD FOR ANALYZING REAL-ESTATE INVESTMENT OPPORTUNITIES

(71) Applicant: Nikith Rajendran, Orlando, FL (US)

(72) Inventor: Nikith Rajendran, Orlando, FL (US)

( * ) Notice: Subject to any disclaimer, the term of this patent is extended or adjusted under 35 U.S.C. 154(b) by 116 days.

(21) Appl. No.: 17/153,348

(22) Filed: Jan. 20, 2021

(65) Prior Publication Data

US 2021/0142416 A1    May 13, 2021

(51) Int. Cl.
*G06Q 40/06* (2012.01)
*G06Q 50/16* (2012.01)
(52) U.S. Cl.
CPC ............. *G06Q 40/06* (2013.01); *G06Q 50/16* (2013.01)
(58) Field of Classification Search
CPC ............................. G06Q 40/06; G06Q 50/016
See application file for complete search history.

(56) References Cited

U.S. PATENT DOCUMENTS

| | | | | |
|---|---|---|---|---|
| 2006/0089842 A1* | 4/2006 | Medawar | ............... | G06Q 50/16 705/4 |
| 2008/0189198 A1* | 8/2008 | Winans | ................. | G06Q 90/00 705/1.1 |
| 2011/0218934 A1* | 9/2011 | Elser | ...................... | G06Q 40/02 705/36 R |
| 2011/0307414 A1* | 12/2011 | Hansen | .................. | G06Q 40/06 705/36 R |
| 2012/0158561 A1* | 6/2012 | Gannon | ................. | G06Q 40/06 705/30 |
| 2015/0120608 A1* | 4/2015 | Leftwich | ............... | G06T 11/206 705/36 R |

OTHER PUBLICATIONS

Szumilo, N., Wiegelmann, T., Łaszkiewicz, E., Pietrzak, M. B., & Balcerzak, A. P. (2018). The real alternative? A comparison of german real estate returns with bonds and stocks. Journal of Property Investment & Finance, 36(1), 19-31. doi:http://dx.doi.org/10.1108/JPIF-02-2017-0012 (Year: 2018).*

* cited by examiner

Primary Examiner — Kito R Robinson
(74) Attorney, Agent, or Firm — Barry Choobin; Patent 360

(57) ABSTRACT

A system and method for providing analytical insights on real estate investment opportunities. When scouting for real estate investment opportunities, investors are mainly interested in its financial aspects, for example, its estimated performance and how its performance and risk compare against those of other real estate and non-real estate investment opportunities such as equities and bonds, etc. The system was conceived and developed to provide real estate investors with novel insights on such financial aspects so that they can make informed decisions. The system includes an import module that can be connected to a real estate database for importing real estate listings. The system receives a selection of property from an investor and pulls the real estate listing's data related to that property. The system processes real estate listing's data to obtain novel analytical insights. Each analytical insight is presented as a widget on an interface.

6 Claims, 12 Drawing Sheets

700

Compare the 1st year's rate to S&P 500 dividend rate of 1.95%!!!

8.6%*
Growth rate (or the Return on Investment- ROI over a 30 year period)

9.6%*
Annualized growth rate when net cash flow is also reinvested in a similar investment

Can this home make you a millionaire??
(who wouldn't want to be a millionaire, duh???)

Your investment of $51k* would be worth $624k* in 30 years. And if you reinvest the net cash flow proceeds, it could be worth $813K*)

Fig. 8

Note:
1. If you decide to cash out after 10 years, AGR will be ~13.3% & with reinvested net cash flows, AGR ~17.4%

2. Default annual home price appreciation is assumed to be 2.8%. You can change this under "set parameters". You can increase your AGR even more by investing in an area with higher expected appreciation!

Here is what else you can do to improve your returns
Take a look at other regions that have good returns + growth potential

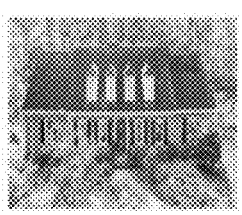 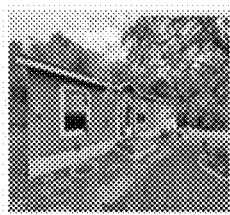  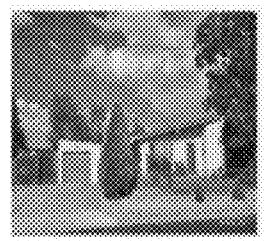

Bedroom: 4
Bathroom: 3
Price: 525000
Region: Charlotte
[For more]

Bedroom: 3
Bathroom: 2
Price: 124900
Region: Austin
[For more]

Bedroom: 2
Bathroom: 2
Price: 289900
Region: Austin
[For more]

Bedroom: 3
Bathroom: 1
Price: 239900
Region: Reno
[For more]

Fig. 15

Region

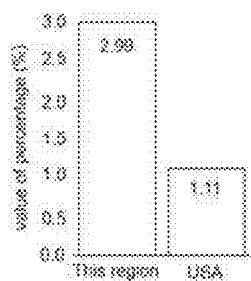 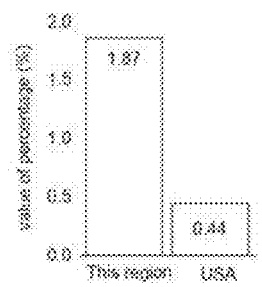 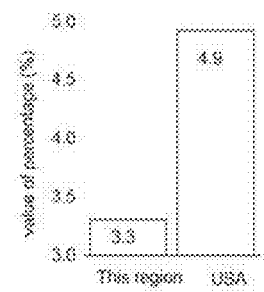 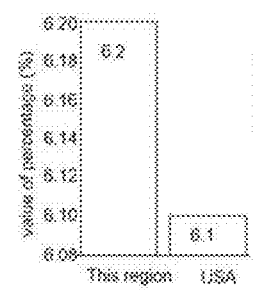

Avg. job growth | Avg. population | Unemployment | Rental Vacancy

Fig. 16

SYSTEM AND METHOD FOR ANALYZING REAL-ESTATE INVESTMENT OPPORTUNITIES

FIELD OF INVENTION

The present invention relates to a system and method for analyzing real estate investment opportunities, and more particularly, the present invention relates to a system and method for analyzing real estate properties for making informed decisions.

BACKGROUND

Real estate investors are mainly interested in financial metrics and aspects of a potential investment, for example, the predicted performance of investments and benchmarking of investments like how an investment's expected performance and risk compares against other real estate opportunities as well as other non-real estate opportunities such as stocks and bonds, etc.

Thus, the real estate investors desire a platform that can provide answers and analytical insights for making informed decisions in real estate investments.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system for providing analytical insights for making informed decisions in real estate investments.

It is another object of the present invention that the system provides a widget engine for real estate investment analytics.

It is still another object of the present invention that the widget engine provides a widget that allows the user to tweak and play around with different assumptions.

In one aspect, disclosed is a system and method for providing analytical insights for real estate investment transactions. The disclosed system includes an import module that can be connected to a real estate database for importing real estate listings. The real estate listing includes the properties available for sale. The real estate listings can include details about the listings, such as location, price rent estimate, mortgage, and like. The import module may also be connected to a market database to import financial information about stocks, mutual funds, bonds, and the like. The import module may also include one or more filters that can be configured to look for real estate listings and financial information based on predetermined markers. The filter may also allow cleaning, structuring, formatting, compressing, and indexing the imported data into a database. The structuring of the clean data may include breaking the data into chunks each having its own attributes.

In one aspect, disclosed is a system and method for providing analytical insights for real estate transactions. The disclosed system provides an interface for interacting with an user and receiving common input from the user. The disclosed system further provides a widget engine that presents multiple widgets to the user. The widget engine can query the database based on the common and additional input from the user and process the queried data for analytical insights. Each widget can provide at least one analytical insight to the user, wherein one or more widgets can also receive additional input from the inventor.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 7 shows an exemplary embodiment of a widget, according to the present invention.

FIG. 8 shows another exemplary embodiment of the widget, according to the present invention.

FIG. 15 shows another exemplary embodiment of the widget, according to the present invention.

FIG. 16 shows another exemplary embodiment of the widget, according to the present invention.

Figure 1:
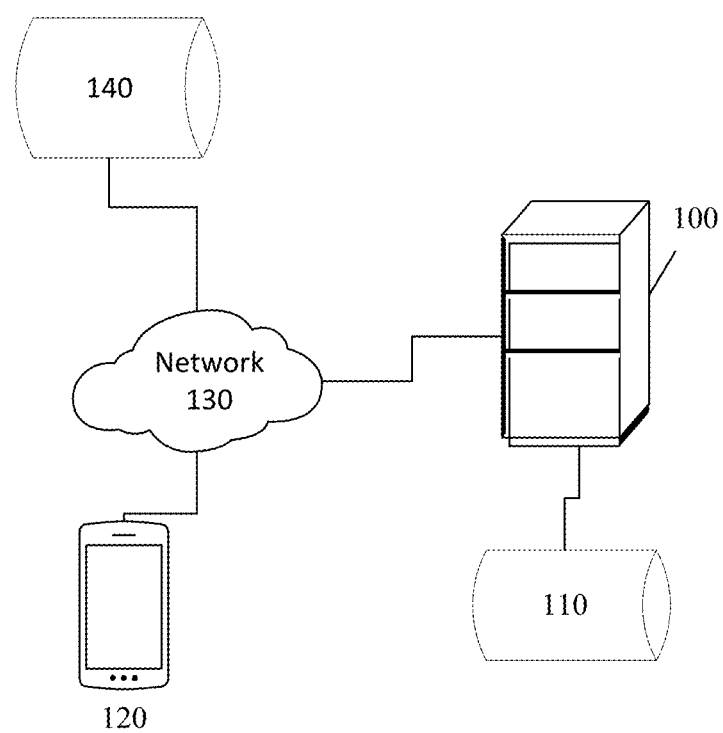
FIG. 1 is an environment diagram showing the system connected to a main database, commercial real estate listings database, and a user device through a network, according to an exemplary embodiment of the present invention.

Although the specific features of the present invention are shown in some drawings and not in others. This is done for convenience only, as each feature may be combined with any or all the other features in accordance with the embodiments herein.

DETAILED DESCRIPTION

Subject matter will now be described more comprehensively hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a system and method for providing analytical insights for making informed decisions in real estate transactions, such as investments. Now referring to FIG. 1 which is an environment diagram showing the system 100 connected to a main database 110. The system 100 can further be connected to at least one user device 120 through the network 130. The disclosed system can also be connected to a real estate database 140 through the network 130. The system 100 according to the present invention provides multiple analytical insights, each presented on an interactive widget, to investors for making informed decisions about real estate transactions. The main database 110 can store the real estate data listings and market data. According to certain embodiments, the user device 120 can be a computing device having a display. Examples of the computing device include a smartphone, laptop, desktop, tablet computer, personal digital assistant ("PDA"), or the like. The computing device can include an operating system, such as Android and iOS.

The system 100 can be connected to the user device 120 through the network 130. The network 130 can be wired or wireless network. The wired network may include Digital Subscriber Line (DSL), coaxial cable lines, or optical fiber lines. The wireless network may include BLUETOOTH, Wi-Fi, Worldwide Interoperability for Microwave Access (WiMAX), an infrared channel or satellite band. The wireless network may also include any cellular network standards used to communicate among mobile devices, including standards that qualify as 3G, 4G, or 5G.

Figure 2:
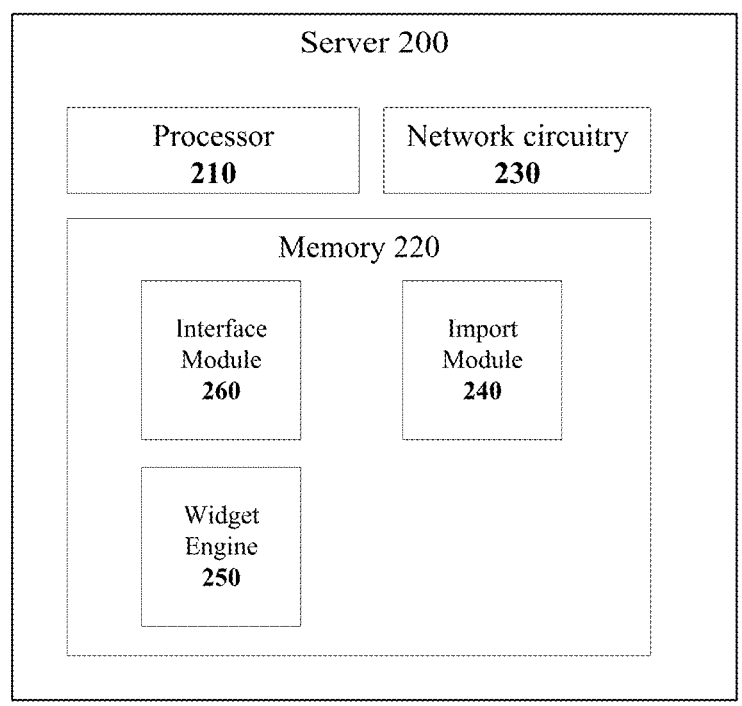
FIG. 2 is a block diagram showing the system, according to an exemplary embodiment of the present invention.

According to an embodiment of the present invention, system 100 may include a single or multiple, logically grouped servers. According to an exemplary embodiment, the servers may be geographically dispersed. One or more of the servers can include an operating system platform, for example, Windows, Unix, Linux, or Mac. An embodiment of the system 200 is shown in FIG. 2 having a processor 210, a memory 220, and a network circuitry 230, wherein the memory 220 and the network circuitry 230 are in electronic communication with the processor 210. As shown in FIG. 2, the memory includes one or modules according to the present invention which when executed by the processor 210 causes the processor 210 to perform one or more functions of the present invention. The memory 220 includes an interface module 260, Import module 240, and a widget engine 250.

In one embodiment, the interface module can provide a user's interface on a user device. A user desiring to interact with the disclosed system can download the user's interface from the system. The interface can be provided as application software that can be installed on a user device. The application software can be developed for Android, iOS, and any other known operating platform for mobile devices. The application software can be made available through a distribution service provider, for example, Google Play operated and developed by Google and the app store by Apple. In addition to the application software, a website-based interface can also be provided through the world-wide-web. At first, a user may register with the disclosed system through the user interface, wherein the interface module may present a registration form on the user interface. The interface module may also allow a user to send a query to the system and view the analytical insights.

Figure 3:
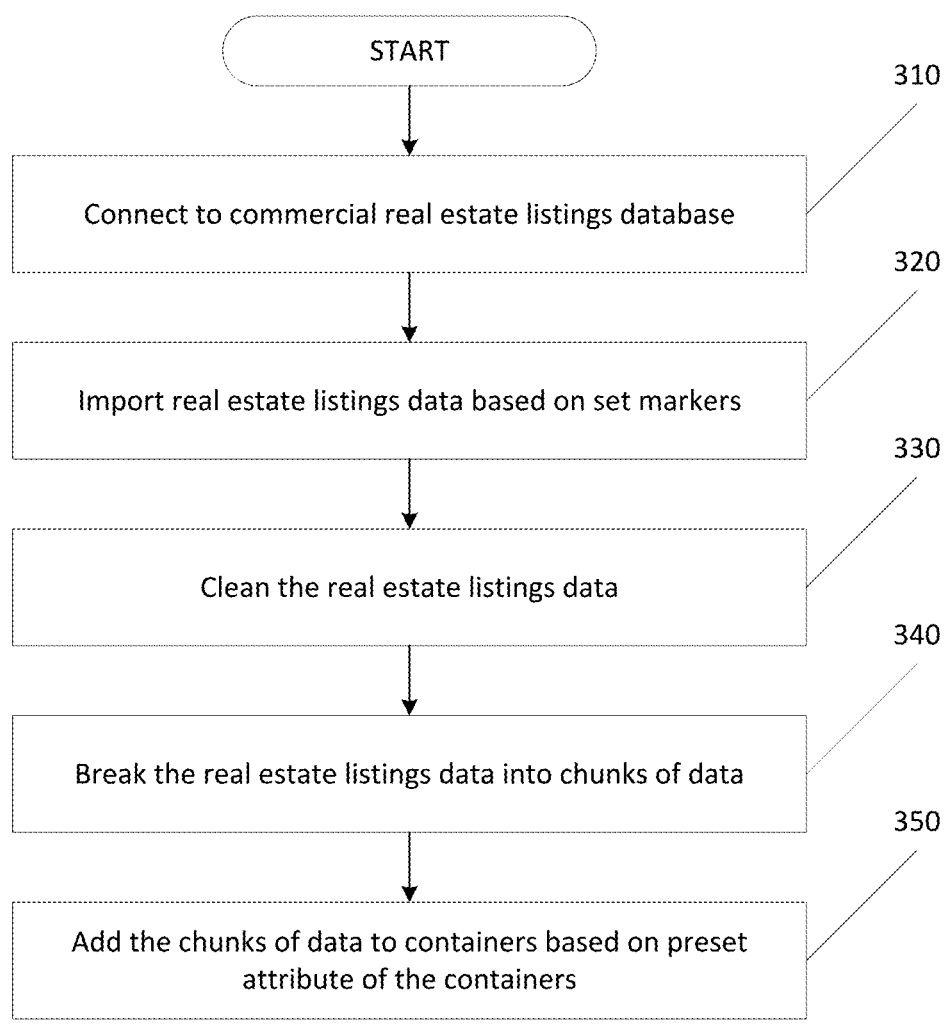
FIG. 3 is a flow chart showing the import module, according to an exemplary embodiment of the present invention.

An embodiment of the import module is shown in FIG. 3 and described below. The import module may connect to commercial databases for importing real estate listings data and market data. At step 310, the import module can be connected to a real estate listings database. For example, MLS is a database having multiple real estate listings. An investor or a user can search a property and the import module can import the real estate listings data related to that property and related properties from the commercial database, at step 320. The import module can have preset markers that may define how data can be imported. The imported data can be cleaned, at step 330. The cleaned data may be broken down into chunks of the data for organizing and storing the data in the main database, at step 340. The chunks of data can be added to pre-defined containers. Each container having its attributes and variables. The chunks of data can be added to the container based on the attribute of the container, at step 350.

Figure 4:
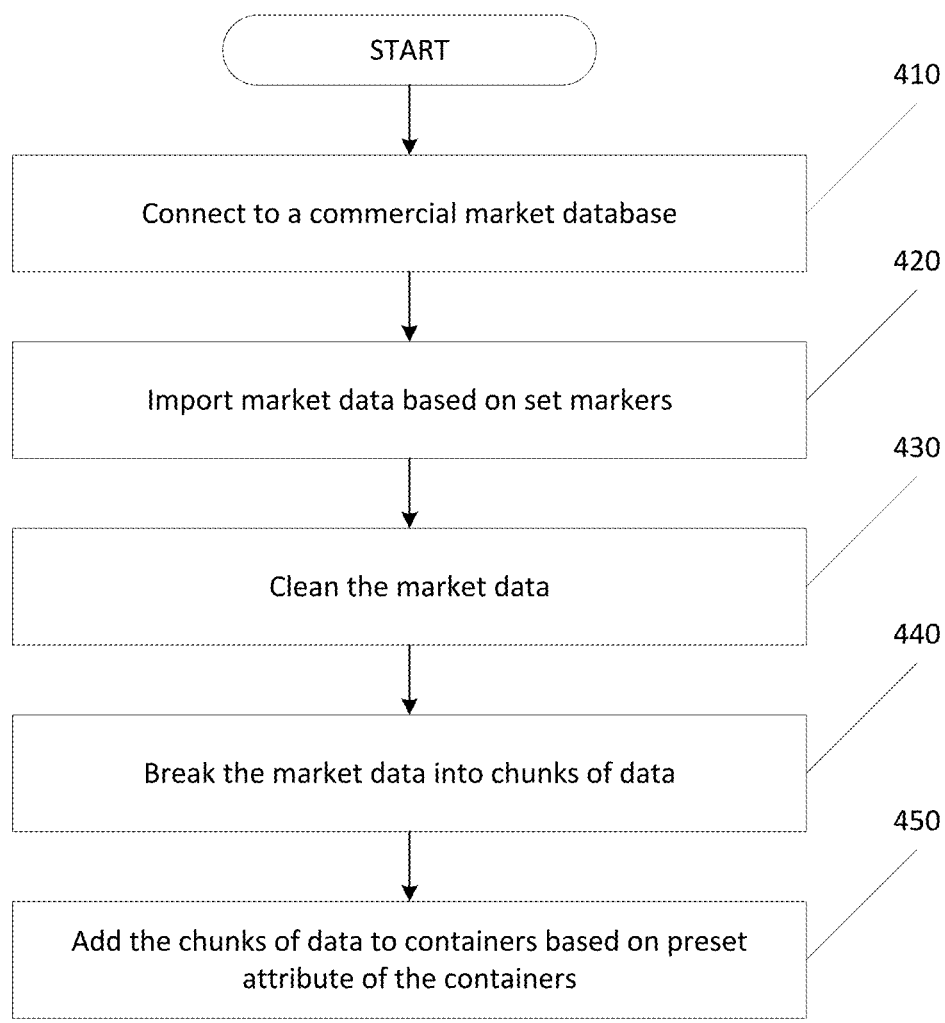
FIG. 4 is a flow chart showing another exemplary embodiment of the import module, according to the present invention.

Referring to FIG. 4, which shows another embodiment of the import module. The import module can also be connected to a commercial market database to import information related to stocks, bonds, S&P index and like. At step 410, the import module may connect to the commercial market database. The import module may import the market data based on preset markers. The market data can be cleaned, at step 430 to remove undesired characters, formats, and data. The market data can then be broken in chunks of data, at step 440 and the chunks can be added to container, at step 450.

Figure 5:
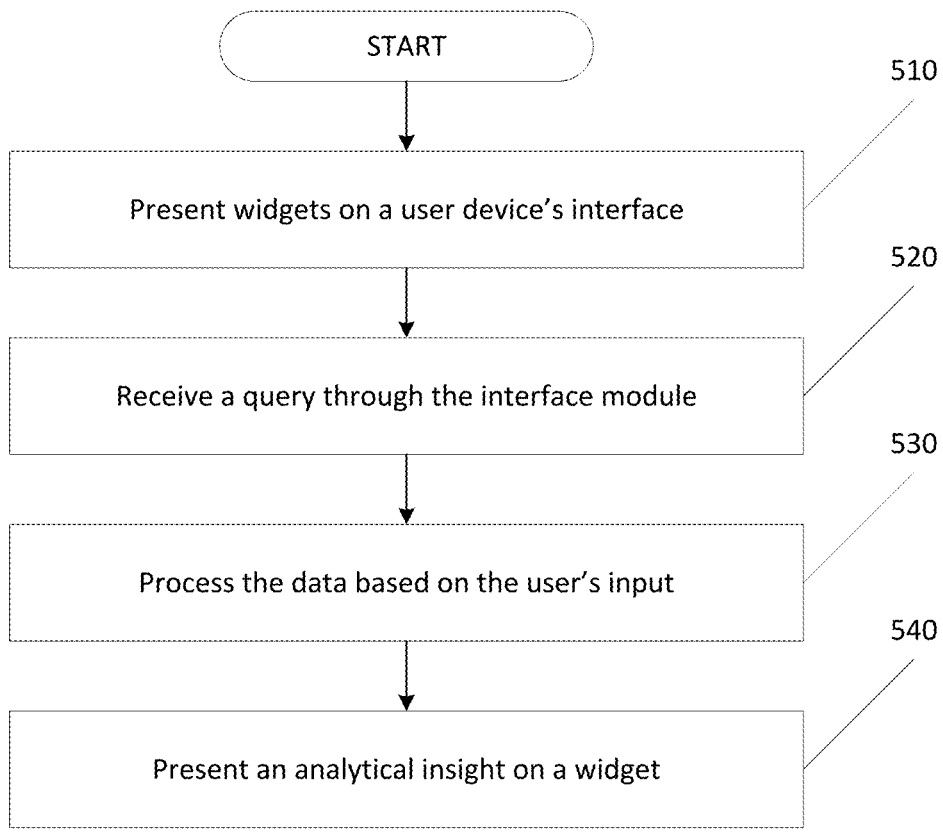
FIG. 5 is a flow chart showing an exemplary embodiment of the widget engine, according to the present invention.

FIG. 5 shows an exemplary embodiment of the widget engine. The widget engine can process the real estate data and the market data based on the query of the user to obtain the analytical insights. The analytical insights can be presented as interactive widgets on the user interface. A widget can also receive additional queries from the user and modify the related analytical insight based on the additional query. The main query and the additional query may include assumptions and parameters provided by the user. The widget engine can present widgets on the user interface, at step 510. For example, when the user interface is a website, widgets can be provided on a web page presented on the user device. The widget engine can receive a query through the user interface, at step 520. The import module can import the data based on the query as described above in FIG. 4. The data can be processed by the widget engine based on the user's input to obtain the analytical insights. The user's input includes the query and assumptions from the user, at step 530. The widget engine can then present the analytical insights on the interactive widgets presented on the user interface, at step 540. The widget engine can automatically calculate an assortment of financial metrics and provide analytical insights for the property.

Figure 6:
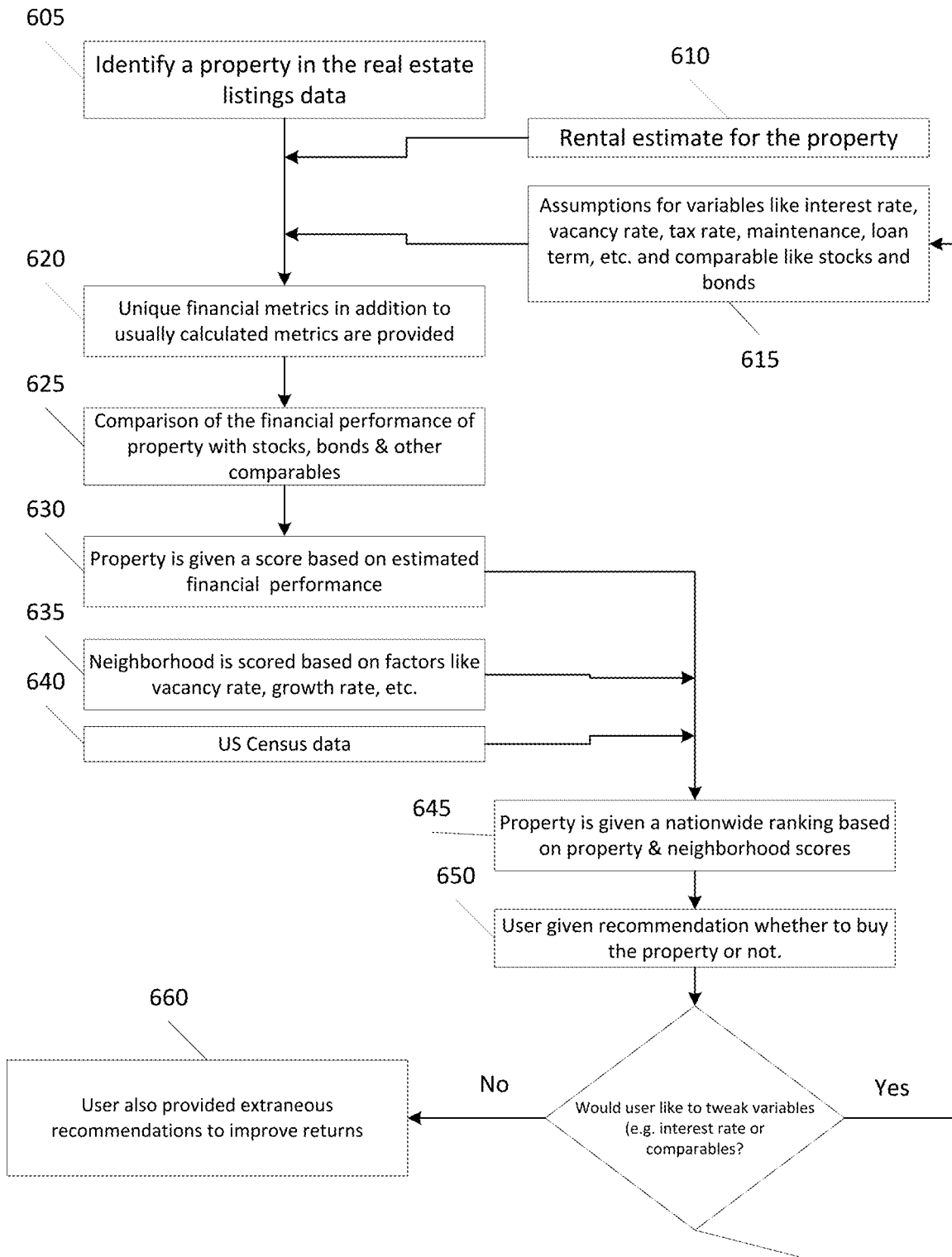
FIG. 6 is a flow chart showing another exemplary embodiment of the widget engine, according to the present invention.

FIG. 6 shows a detailed description of the method of the widget engine. Once a property is identified by the investor or user, at step 605, the import module can pull data related to the identified property from the real estate listing. The widget engine can receive the rental estimate of the property from the data, at step 610. Additionally, the widget engine can pull the assumptions for variables like interest rate, vacancy rate, tax rate, maintenance estimate, loan term, etc. and values for comparables like stocks and bonds etc., at step 615. The widget engine can then determine financial metrics, at step 620, by processing the data received at steps 610 and 615. The widget engine provides the comparison of the financial performance of the property with other properties, stocks, bonds & other financial instruments. The property is given a score based on estimated financial performance, at step 630. Additionally, the property can be given a nationwide ranking based on both the property's standalone & neighborhood scores, at step 645. The widget engine may score neighborhood based on factors like vacancy rate, growth rate, etc., at step 635. US Census data can also be received, at step 640. The widget engine can provide recommendations to the user on whether to buy the property or not, at step 650. The different analytical insights can be presented on different widgets providing a roadmap to the user to reach a decision, at step 650. A user can provide additional information by tweaking the variables, such an annual maintenance or comparables, at step 655. In case, the user does not provide any additional information at step 655, the user can be provided with extraneous recommendations to further improve the returns, at step 660. In case, the user does provide the additional information at step 655, the process from step 615 can be repeated.

Referring to FIG. 7 which shows a widget 700 showing the metric for 'annual growth rate when any net positive cash flow reinvested in a similar investment'. The above metric adds a layer of complexity to the commonly calculated 'annual growth rate' metric. In real estate rental investments, a sizable portion of the return is in the form of net cash flow i.e., net collected rent minus the expenses, mortgage, tax, and insurance payments. This metric helps answer the question 'what if the net cash flow that collects at the end of every year is also reinvested in a similar investment?'. The significance of this metric is that it enables an apples-to-apples comparison between real estate investments and stocks/equities/bond investments since Stocks/Mutual funds/Index funds/Bonds/Bond funds/ETFs are often expressed in terms of return/growth rate wherein the 'dividends are also reinvested in the same investment'.

FIG. 8 shows another widget 800 for "Will this home make you a millionaire?" This section can help the user in determining whether his/her investment worth 'x' in that +real estate property would make him/her a millionaire at the end of either 10 years or 30 years (which are some of the common term periods for mortgage loans). Although simple in construct, this is a profound tool in helping the average user (especially the ones with an untrained eye in financial metrics) decipher whether this property will help him/her in attaining one of the commonly celebrated financial goals i.e., to become a millionaire.

Figure 9:
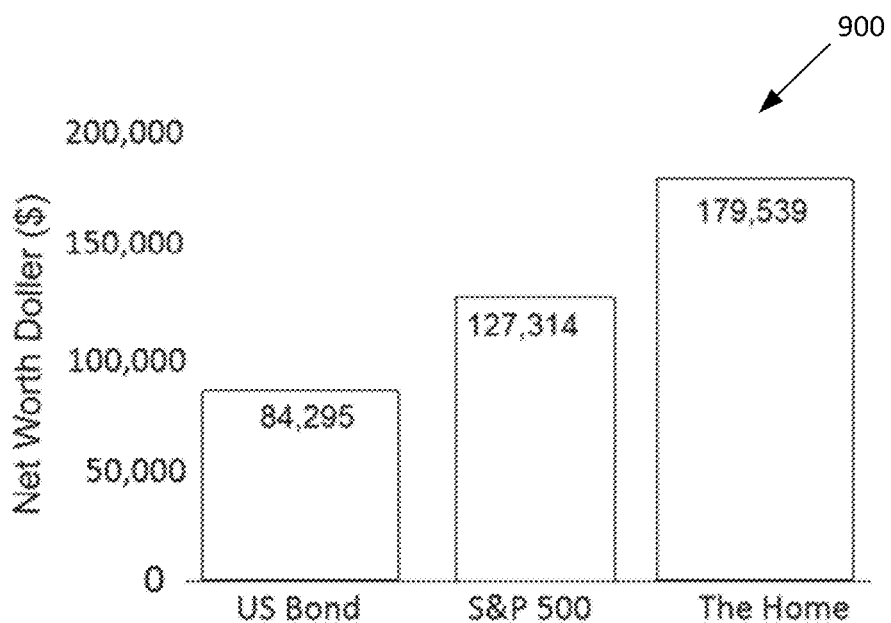
FIG. 9 shows another exemplary embodiment of the widget, according to the present invention.
Figure 10:
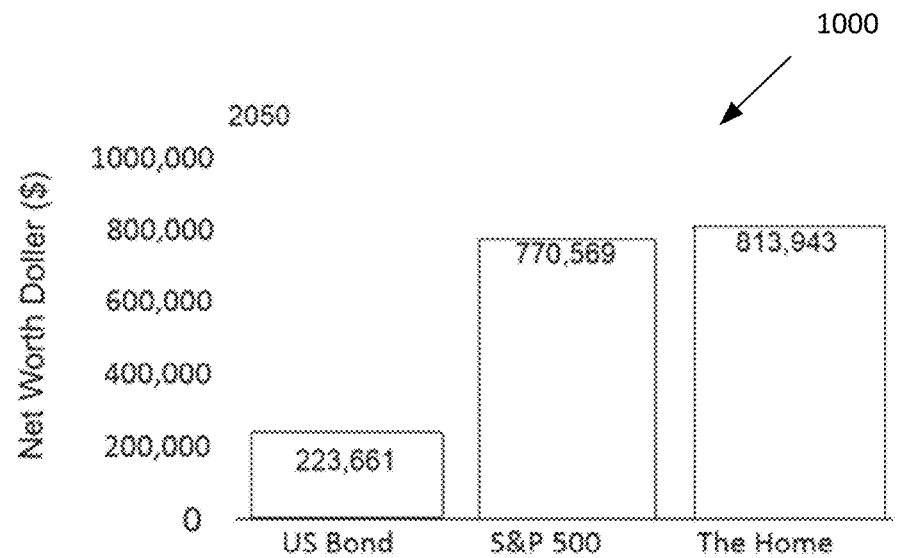
FIG. 10 shows another exemplary embodiment of the widget, according to the present invention.

Referring to FIGS. 9 and 10 which shows the widget 900 and 1000 of comparing the performance of the investment with other commonly available investment opportunities like US Bonds and S&P 500". In addition to providing the metric which enables seamless comparisons between the growth rates of real estate investments and securities investments, the widget engine may incorporate visual comparisons between different kinds of investments at different points in time (i.e., after 10 years and after 30 years). By default, this section can compare the estimated cumulative net worth of chosen real estate investment with that of US Bond and S&P 500 at the end of 10-year and 30-year periods and displays it on a graph. The user also has the ability to input other investment opportunities in lieu of US Bonds and S&P 500 and use this section to see how those opportunities stack up in comparison to the chosen real estate investment.

Figure 11:
FIG. 11 shows another exemplary embodiment of the widget, according to the present invention.

Referring to FIG. 11, which shows the widget 1100 of scoring of homes based on Cash Flow, Region Growth, Neighborhood Economy. In this widget, each real estate property can be scored using a proprietary algorithm and given a numerical score under each of the following three categories: cash flow, region growth and neighborhood economy. The scores are then averaged to give a 'composite score' for the real estate property. A quantitative scoring approach, such as this, lays the foundation for an effective comparative analysis between real estate properties.

Figure 12:
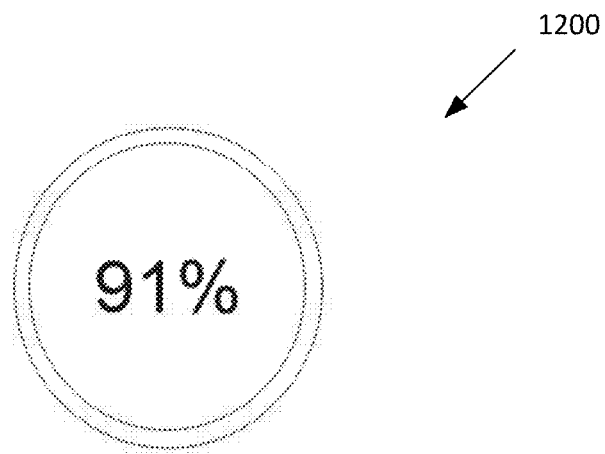
FIG. 12 is a block diagram showing the server, according to an embodiment of the present invention.

Referring to FIG. 12, which shows the widget 1200 of Ranking of homes based on a sample set. In this widget, the composite score of the selected real estate property is compared to the composite scores of a representative sample of homes carefully sourced from across the country and then the selected property is ranked accordingly, with the help of a proprietary algorithm. The result is displayed in terms of a percentile rank. Percentile rank helps the user to quantitatively compare the relative attractiveness of a property as an investment versus other properties either within the same region or outside the selected region.

The widget engine may also provide a YES/NO widget for the recommendation of home as an investment opportunity: Based on the percentile rank, the user can be provided with an explicit recommendation as to whether the selected property is worthy of the user's consideration given its relative attractiveness over other investment options or not. This attribute of the product helps an average user qualitatively understand what the rest of the quantitative metrics are trying to convey.

Figure 13:
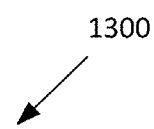
FIG. 13 shows another exemplary embodiment of the widget, according to the present invention.

Referring to FIG. 13 which shows a widget 1300 for what will happen when the investment is sold off early i.e., more specifically it shows what would be the annualized growth rate when it is sold off after 10 years. Studies show that the average holding period for a residential real estate property is around 13.3 years. This number might vary from year to year depending on the economic climate. However, it can be noticed that this median duration of ownership is shorter than the term period of most common mortgage loans i.e., 30 years. Given this backdrop, it would be convenient for the user to understand what would be the changes to the metrics of 'annual growth rate' and 'annual growth rate' when the net positive cash flow is reinvested in a similar investment, when the user sells the property early after purchase of the property.

Figure 14:
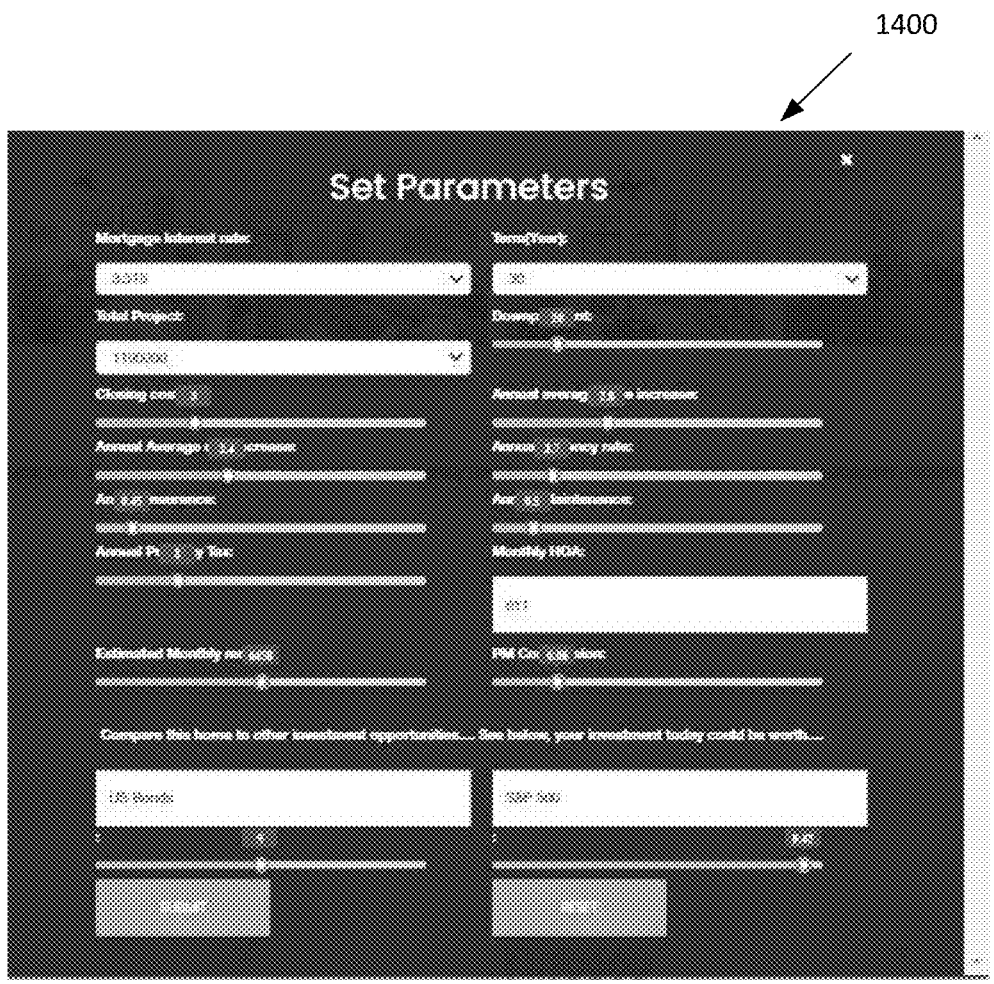
FIG. 14 shows another exemplary embodiment of the widget, according to the present invention.

Referring to FIG. 14 showing the widget 1400 for Ability to change parameters under the 'Set Parameters' tab. The widget provides the user with the ability to tweak and play around with all the assumptions (by inputting different value sets for the assumptions) that underlie the calculations behind the unique metrics described above for FIGS. 7 to 13. This can be done by accessing the 'Set Parameters' tab. Here the user can tweak parameters like average annual maintenance, annual rent increase, closing costs, investment comparables (like US Bonds and S&P 500) & their return rates, among others. This tool gives experienced users the freedom to experiment with different assumptions and see the implications of such changes on the metrics. For example, let's say an experienced user expects a selected property's rent to appreciate 5% every year on account of the region's rapid population growth as opposed to our default estimate which is often conservative. Then the user can set the 'average annual rent increase' to 5% under the 'set parameters' tab and recalculate the metrics.

Referring to FIG. 15, which shows a widget 1500 for the Recommended Regions. For users who are indifferent when it comes to the selection of a region, this tool provides them a set of 'recommended regions' along with some recommended properties that are generally expected to give returns better than average. Recommended regions carefully selected based on expert analysis of a set of variables. This tool is useful to an average user who has not had the time to analyze and compare the expected performance of real estate in different regions.

Referring to FIG. 16 which shows a widget 1600 for Median household income, Local Vacancy rate, Local Unemployment rate, Local population & employment growth rate. The combination of the above metrics i.e., local median household income, local vacancy rate, local unemployment rate & local employment growth rate is an indicator of the health of the local economy and hence can be a barometer in gauging the appeal of the neighborhood as an investment destination. Yet it is conspicuously absent in any publicly available real estate website. The data for these metrics is sourced from the US Census Bureau.

While the foregoing written description of the invention enables one of ordinary skill to use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system for providing novel analytical insights and metrics for making informed decisions in a real estate transaction, the system comprises a processor and memory in communication with the processor, the system configured to implement a method comprising:
    presenting a user interface;
    receiving a query related to a property from the user interface;
    importing, by an import module implemented within the system and upon execution by the processor, real estate data based on the query from a first database, wherein the first database is external to the system;
    processing the real estate data into chunks each having its own attributes, wherein the chunks of data are stored in pre-defined containers based on the attributes;
    importing, by the import module, market data related to at least stocks and bonds from a second database, wherein the second database is external to the system;
    processing the market data into chunks, wherein the chunks of the market data are stored in pre-defined containers;
    presenting, by a widget engine implemented within a system and upon execution by the processor, a plurality of interactive widgets on the user interface, wherein each interactive widget is configured to receive one or more parameters through the user interface;
    processing by the widget engine, the stored market data and the stored real estate data to obtain an analysis, wherein the analysis comprises comparison of financial performance of a property with other properties and non-real estate investment; and
    presenting, by the widget engine, the analysis on the plurality of interactive widgets.

2. The system according to claim 1, wherein the analysis plurality of novel analytical insights and metrics comprises:
    a. annualized growth rate of an investment when net cash flow or the net proceeds are reinvested in a similar type of investment;
    b. timeline whether and when the investment will enable the user to realize common financial/net-worth milestones;
    c. effects of an early termination or an early sale or change in term periods on financial performance of the investment;
    d. investability scores for the property and its neighborhood based on a set of investability and socioeconomic criteria;
    e. percentile Rank for the property that estimates its performance relative to that of a representative sample of properties.

3. The system according to claim 1, wherein the method further comprises:
    presenting, by the widget engine, one or more recommendations, the one or more recommendations comprises:
    a. investabilty of a selected property; and
    b. actions that users can take to maximize risk adjusted returns for their capita.

4. The system according to claim 1, wherein the plurality of interactive widgets are configured to:
    a. permits a user to specify the other properties and non-real estate investment, and
    b. permits the user to specify values for the one or more parameters, the one or more parameters comprises vacancy rate and annual maintenance for the property.

5. The system according to claim 2, wherein the investability scores are calculated by determining a region's vacancy rate, unemployment level, household income and property's estimated financial performance and then comparing them with the national averages as well as with those of the best performers.

6. The system according to claim 2, wherein percentile Rank is by:
    considering a carefully sourced representative sample set of investment properties listed in the database;

calculating a composite score for each property in the representative sample set; and ranking the composite score of the selected property against that of the representative sample set.

\* \* \* \* \*